(12) United States Patent
Kim et al.

(10) Patent No.: US 9,140,360 B2
(45) Date of Patent: Sep. 22, 2015

(54) PARKING MODE MANUALLY RELEASING DEVICE FOR SHIFT-BY-WIRE TYPE AUTOMATIC TRANSMISSION

(71) Applicant: Kyung Chang Industrial Co., Ltd., Daegu (KR)

(72) Inventors: Kyujung Kim, Daegu (KR); Changmin Lee, Daegu (KR)

(73) Assignee: KYUNG CHANG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 13/919,456

(22) Filed: Jun. 17, 2013

(65) Prior Publication Data

US 2014/0305245 A1   Oct. 16, 2014

(30) Foreign Application Priority Data

Apr. 11, 2013   (KR) .................. 10-2013-0039633

(51) Int. Cl.
```
B60K 20/00    (2006.01)
F16C 1/10     (2006.01)
G05G 9/00     (2006.01)
F16H 63/34    (2006.01)
B60W 10/11    (2012.01)
B60W 10/18    (2012.01)
F16C 1/12     (2006.01)
```

(52) U.S. Cl.
CPC ............ *F16H 63/3491* (2013.01); *B60W 10/11* (2013.01); *B60W 10/182* (2013.01); *F16C 1/12* (2013.01); *F16C 1/10* (2013.01); *F16C 1/105* (2013.01); *Y10T 74/20238* (2015.01)

(58) Field of Classification Search
CPC .......... F16H 63/3491; F16H 2061/226; F16H 61/36; F16H 63/3433; F16H 63/3458; F16H 63/3408; F16H 63/3441; F16H 63/3466; B60T 11/046

USPC ....... 74/500.5, 501.6, 471 R, 473.11, 473.12, 74/473.15, 473.18, 473.19, 473.21, 74/473.29; 192/219.4, 219.6, 220.4, 192/220.7, 220; 188/2 D
See application file for complete search history.

(56) References Cited

U.S. PATENT DOCUMENTS 3,729,070 A *  4/1973  Le Marchand ................. 188/170
6,065,581 A *  5/2000  Nogle ......................... 192/219.5

(Continued)

FOREIGN PATENT DOCUMENTS

| KR | 20-0359882 Y1 | 8/2004 |
| KR | 10-0887840 B1 | 3/2009 |
| KR | 10-2009-0065978 A | 6/2009 |
| KR | 10-2011-0061348 A | 6/2011 |
| KR | 10-2011-0062879 A | 6/2011 |
| KR | 2012-0133537 A | 12/2012 |

*Primary Examiner* — David M Fenstermacher
*Assistant Examiner* — Jake Cook
(74) *Attorney, Agent, or Firm* — Mintz Levin Cohn Ferris Glovsky and Popeo, P.C.; Kongsik Kim; Carolina Säve

(57) ABSTRACT

A parking mode manually releasing device for a shift-by-wire type automatic transmission is provided. The parking mode manually releasing device includes a housing that has a translational motion in interlock with rotation of a shift control lever of the automatic transmission. Additionally, a rod member is arranged to slide as far as a predetermined stroke relative to the housing and has a locking part and a locking clip is fastened to the housing. When the locking part is locked by the locking clip, the translational motion of the housing is generated in interlock with the sliding motion of the rod member, and the rod member is connected to a cable which is pulled when a parking mode is released manually.

4 Claims, 6 Drawing Sheets

(56) References Cited

U.S. PATENT DOCUMENTS

| | | |
|---|---|---|
| 6,386,338 B1 * | 5/2002 | Powrozek .................... 188/156 |
| 6,631,654 B2 | 10/2003 | Ehrmaier et al. |
| 2010/0288598 A1 | 11/2010 | Giefer et al. |
| 2011/0100150 A1 * | 5/2011 | Tarver .......................... 74/502.4 |
| 2011/0132121 A1 | 6/2011 | Park et al. |
| 2011/0203899 A1 | 8/2011 | Weifels |
| 2011/0226082 A1 * | 9/2011 | Ruhlander ................... 74/502.2 |
| 2011/0240437 A1 | 10/2011 | Saitner et al. |
| 2011/0290615 A1 | 12/2011 | Schwekutsch et al. |
| 2012/0137800 A1 | 6/2012 | Park et al. |

* cited by examiner ing Korean Application No.
10-2013-0039633 filed on Apr. 11, 2013, which is incorporated herein by reference.

TECHNICAL FIELD

The present invention relates to a parking mode manually releasing device for an automatic transmission, and more particularly, to a parking mode manually releasing device for a shift-by-wire type automatic transmission.

BACKGROUND ART

A shift-by-wire type automatic transmission controls transmission by electrically transferring a control signal of a shift lever mounted in a driver's compartment to an automatic transmission.

The automatic transmission has parking mode. If a vehicle cannot travel due to e.g. traffic accident or it is difficult to supply electric power due to battery discharge in parking mode, a user or a person can take a measure such as tow only if the parking mode is forcibly released.

As an example, Korean Patent Laid-open Publication No. 10-2011-0090962 published on Aug. 10, 2011 discloses a manually releasing device of a parking mode. However, the manually releasing device has several problems that a lever structure is complicated and in that there is a restriction in the repetition number of operations due to a limitation in capacity of the battery because an electromagnet is used.

SUMMARY

Accordingly, the present invention has been made to solve the above-mentioned problems occurring in the prior arts, and it is an object of the present invention to provide a parking mode manually releasing device for an automatic transmission which has a simple structure and is not an electronic type but uses an electromagnet.

To achieve the above objects, the present invention provides a parking mode manually releasing device for a shift-by-wire type automatic transmission including: a housing having a translational motion in interlock with rotation of a shift control lever of the automatic transmission; a rod member arranged in such a way as to slide as far as a predetermined stroke relative to the housing and having a locking part; and a locking clip fastened to the housing. When the locking part is locked by the locking clip, the translational motion of the housing is generated in interlock with the sliding motion of the rod member, and the rod member is connected to a cable which is pulled when a parking mode is released manually.

The predetermined stroke may be defined by a first position in a first shift mode, which is an initial position of the shift control lever under a normal operation environment of the automatic transmission, and by a second position in a second shift mode, which is the maximum rotational position of the shift control lever.

It is preferable that in the first position, the locking part is locked by the locking clip.

The first position is the position in the parking mode, and under an abnormal operation environment of the automatic transmission, when the cable is pulled, the locking part is pulled in the state where the locking part is locked by the locking clip so as to cause the translational motion of the housing, so that the shift control lever is rotated to a neutral mode.

The parking mode manually releasing device for the automatic transmission according to the present invention is very simple in structure and does not transfer an operation of a shift control lever to a cable in a normal operation environment and can manually release the parking mode in an abnormal operation environment. Moreover, the parking mode manually releasing device for the automatic transmission can manually release the parking mode without any restriction in the number of operations because it is not an electronic type device.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Reference will be now made in detail to the preferred embodiment of the present invention with reference to the attached drawings.

Figure 1:
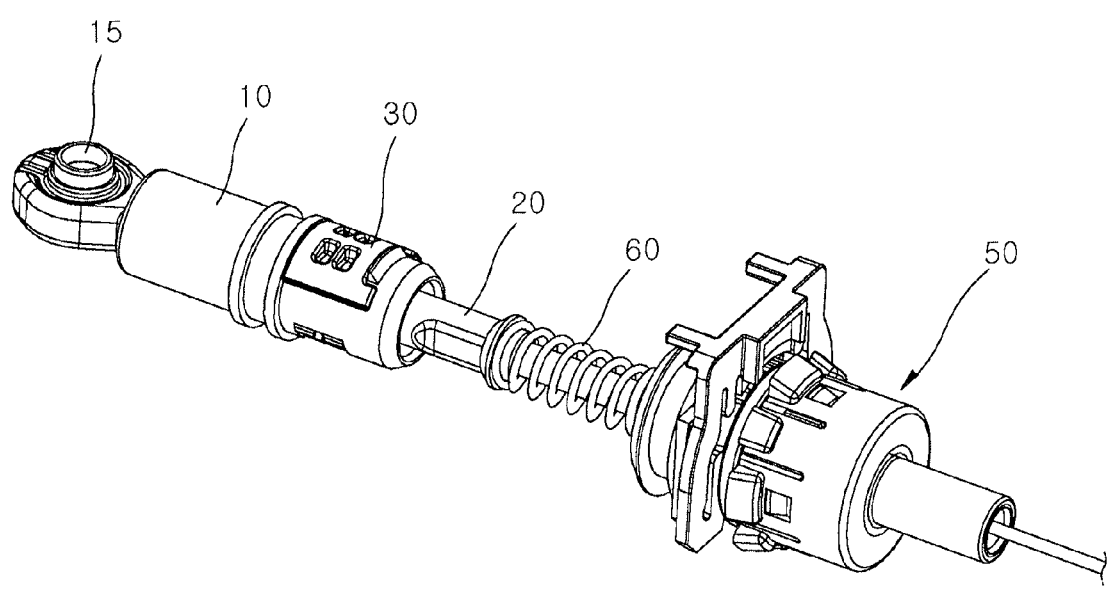
FIG. 1 is a perspective view of a parking mode manually releasing device according to the present invention.
Figure 2:
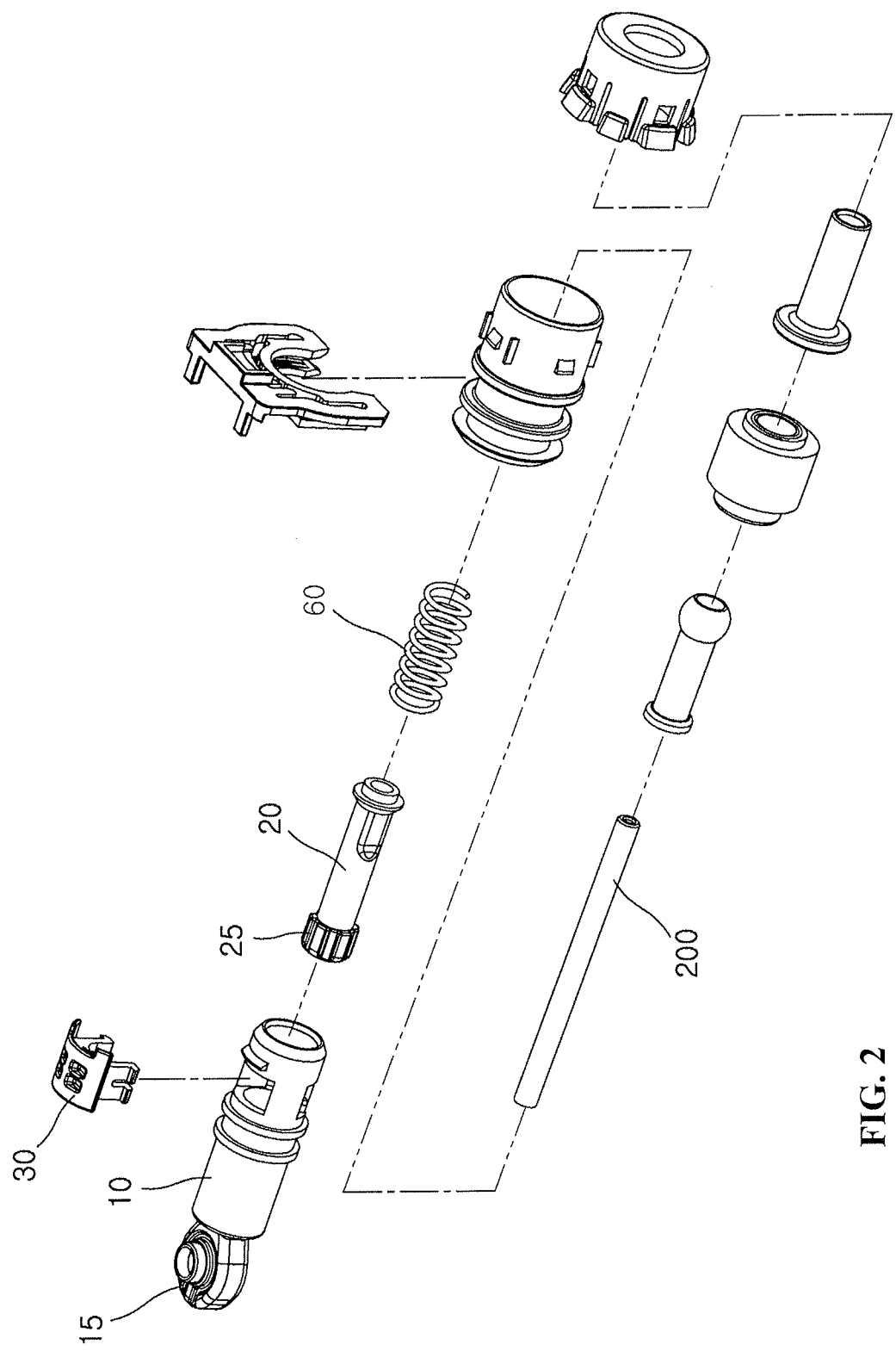
FIG. 2 is an exploded perspective view of FIG. 1.

FIG. 1 is a perspective view of a parking mode manually releasing device according to the present invention, and FIG. 2 is an exploded perspective view of FIG. 1. The parking mode manually releasing device for an automatic transmission according to the present invention is manipulated by a cable pulling device provided in the driver's compartment. The present invention relates to a device connected to a shift control lever of the transmission but does not relate to the cable pulling device for manipulating the device.

As shown in FIGS. 1 and 2, the parking mode manually releasing device according to the present invention includes a housing 10, a rod member 20, and a locking clip 30. In order to relieve vibration or noise generated during the operation of the rod member 20, the parking mode manually releasing device may further include a spring member 60. The spring member 60 is omitted in FIGS. 3 to 6 for simplification of illustration.

The parking mode manually releasing device further includes a fastening device 50 provided for fastening the parking mode manually releasing device to a bracket or the like of a vehicle. The fastening device 50 is illustrated in the drawings, but its detailed description will be omitted because it is not one of the core components of the present invention.

A shift lever connection part 15 to which a shift control lever 100 is connected is provided at an end portion of the housing 10, and the rod member 20 is arranged in such a way as to slide as far as a predetermined stroke relative to the housing 10. A locking part 25 is provided to the rod member 20. The locking clip 30 is joined to the housing 10, and the locking part 25 is locked by the locking clip 30 so as to prevent the rod member 20 from being separated from the housing 10, and as described later, the housing 10 is pulled to the right by manipulation of the cable pulling device. Moreover, a cable 200 is connected to the rod member 20, and hence, when the cable 200 is pulled by the cable pulling device (not shown) of the driver's compartment, the rod member 20 is also slidable relative to the housing 10.

Figure 3:
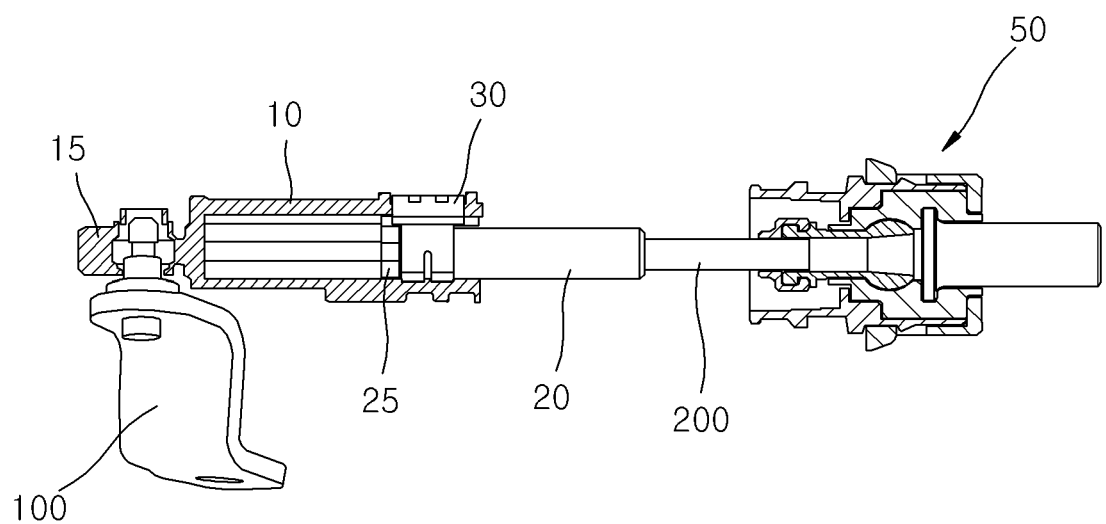
FIG. 3 is a view showing a first shift mode in a normal operation environment.
Figure 4:
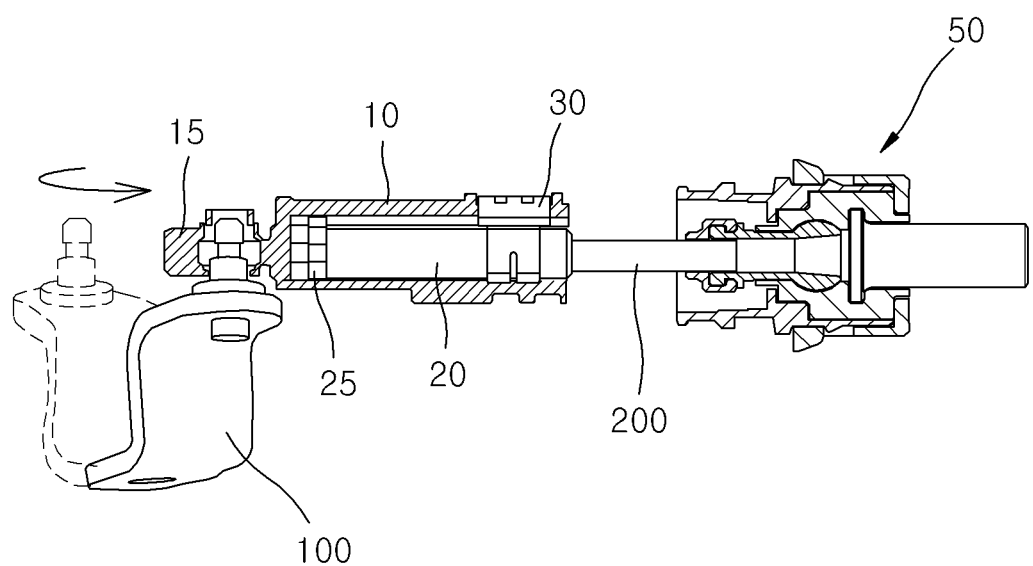
FIG. 4 is a view showing a second shift mode in the normal operation environment.

FIG. 3 is a view showing a first shift mode in a normal operation environment, and FIG. 4 is a view showing a second shift mode in the normal operation environment.

The first shift mode is a parking mode, and the second shift mode is a shift mode in a state where the shift control lever 100 is rotated the most. The second shift mode may be a driving mode (D). In the first shift mode, the locking part 25 is locked by the locking clip 30. Under the situation that the automatic transmission and the electronic shift lever are operated normally, a shift command signal is transferred by the operation of the shift lever so that the shift control lever 100 is rotated normally. As shown in FIG. 4, when the shift control lever 100 is rotated under the normal operation condition, the housing 10 moves to the right, and hence, the rod member 20 relatively slides to the left relative to the housing 10 as shown in FIG. 4. Therefore, the operation of the shift control lever 100 is not transferred to the cable 200 under the normal operation environment.

Figure 5:
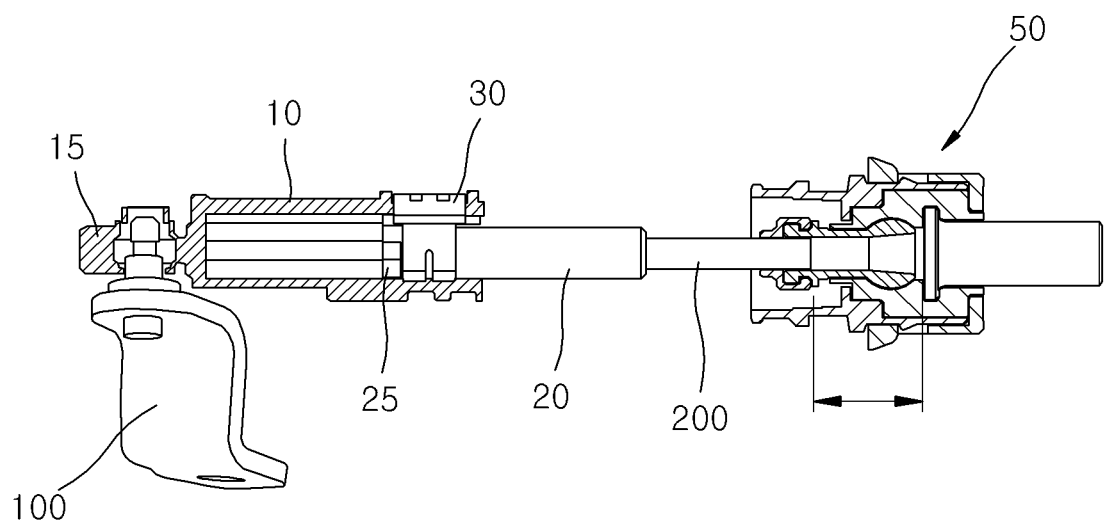
FIG. 5 is a view showing a first shift mode in an abnormal operation environment.
Figure 6:
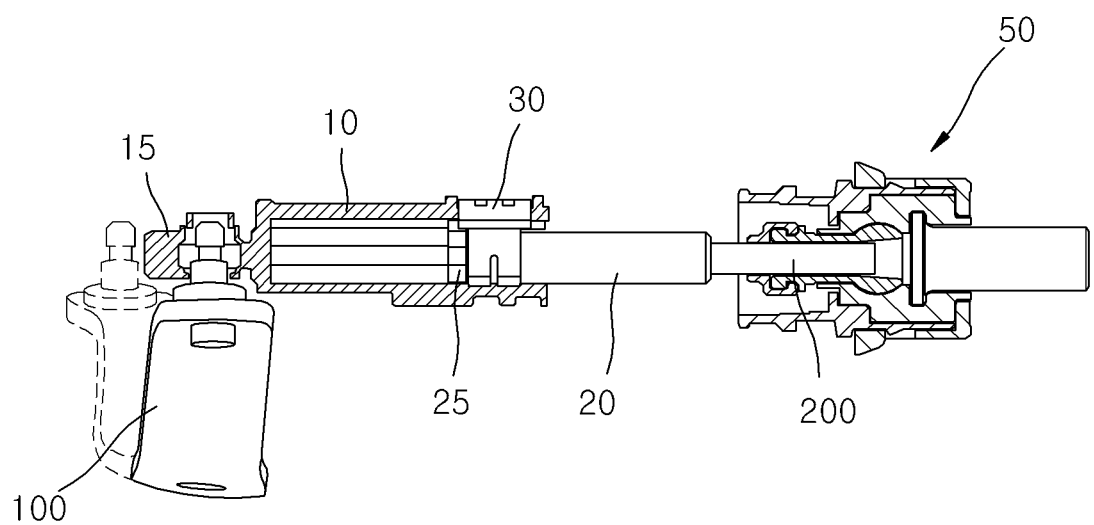
FIG. 6 is a view showing a state where the first shift mode is released in the abnormal operation environment.

FIGS. 5 and 6 illustrate a state where it is not possible to normally shift the automatic transmission due to a discharge of a battery or other reasons.

FIG. 5 illustrates a state of the first shift mode, namely, the parking mode. Like FIG. 3, in FIG. 5, the locking part 25 of the rod member 20 is locked by the locking clip 30. However, in the parking mode, the locking part 25 is not necessarily locked by the locking clip 30 and there may be some space between the locking part 25 and the locking clip 30. That is, if the locking part 25 can move toward the locking clip 30 and pull the housing 10 so as to enable the driver to forcibly manipulate the shift control lever 100 when the cable 200 is pulled by the cable pulling device, the locking part 25 may be located at any position.

When the cable 200 is pulled by the cable pulling device, the rod member 20 is also pulled to the right, and the locking clip 30 and the housing 10 to which the locking part 25 is locked are also pulled to the right. Then, as shown in FIG. 6, the shift control lever 100 connected to the shift lever connection part 15 is rotated to a position to release the parking mode (for instance, a neutral mode), and finally, the parking mode can be released manually.

While the good example embodiment of the present invention has been particularly shown with reference to the attached drawings, it will be understood that the technical scope of the present invention is determined by the following claims and is not limited by the described embodiment and/or drawings. Moreover, it would be understood to those skilled in the art that all changes, modifications and equivalents of the present invention belong to the scope of the present invention.

What is claimed is:

1. A parking mode manually releasing device for a shift-by-wire type automatic transmission comprising:
   a housing having a translational motion in interlock with rotation of a shift control lever of the automatic transmission;
   a rod member arranged in such a way as to slide as far as a predetermined stroke in a parallel manner along a longitudinal direction of the housing while the shift control lever is under normal shift operation and having a locking part; and
   a locking clip fastened to the housing,
   wherein when the locking part is locked by the locking clip, the translational motion of the housing is generated in interlock with the pulling motion of the rod member, and
   wherein the rod member is connected to a cable which is pulled to manually release a parking mode.

2. The parking mode manually releasing device according to claim 1, wherein the predetermined stroke is defined by a first position in a first shift mode, which is an initial position of the shift control lever under a normal operation environment of the automatic transmission, and by a second position in a second shift mode, which is the maximum rotational position of the shift control lever.

3. The parking mode manually releasing device according to claim 2, wherein in the first position, the locking part is locked by the locking clip.

4. The parking mode manually releasing device according to claim 3, wherein the first position is the position in the parking mode, and
   wherein under an abnormal operation environment of the automatic transmission, when the cable is pulled, the locking part is pulled in the state where the locking part is locked by the locking clip so as to cause the translational motion of the housing, so that the shift control lever is rotated to a neutral mode.

* * * * *